US011695162B2

United States Patent
Okutani

(10) Patent No.: US 11,695,162 B2
(45) Date of Patent: Jul. 4, 2023

(54) SECONDARY BATTERY

(71) Applicant: SANYO Electric Co., Ltd., Daito (JP)

(72) Inventor: Oose Okutani, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 203 days.

(21) Appl. No.: 16/978,868

(22) PCT Filed: Feb. 13, 2019

(86) PCT No.: PCT/JP2019/005075
§ 371 (c)(1),
(2) Date: Sep. 8, 2020

(87) PCT Pub. No.: WO2019/176422
PCT Pub. Date: Sep. 19, 2019

(65) Prior Publication Data
US 2020/0411909 A1 Dec. 31, 2020

(30) Foreign Application Priority Data
Mar. 13, 2018 (JP) .................... 2018-045659

(51) Int. Cl.
*H01M 10/0587* (2010.01)
*H01M 50/46* (2021.01)
(Continued)

(52) U.S. Cl.
CPC ..... *H01M 10/0587* (2013.01); *H01M 50/461* (2021.01); *H01M 10/0422* (2013.01);
(Continued)

(58) Field of Classification Search
CPC .......... H01M 50/107; H01M 10/0431; H01M 50/461; H01M 10/052; H01M 50/171;
(Continued)

(56) References Cited

U.S. PATENT DOCUMENTS

2011/0217577 A1* 9/2011 Fukui ................. H01M 10/052
429/94
2013/0216896 A1* 8/2013 Kim .................... H01M 50/186
429/163
(Continued)

FOREIGN PATENT DOCUMENTS

CN 106030890 A 10/2016
JP S54-144221 U 10/1979
(Continued)

OTHER PUBLICATIONS

International Search Report dated May 14, 2019, issued in counterpart application No. PCT/JP2019/005075, with English translation. (3 pages).
(Continued)

*Primary Examiner* — Jonathan G Jelsma
*Assistant Examiner* — Omar M Kekia
(74) *Attorney, Agent, or Firm* — WHDA, LLP

(57) ABSTRACT

A secondary battery according to an embodiment includes: an electrode body which contains a positive electrode, a negative electrode, and at least one separator interposed between the positive electrode and the negative electrode; a case main body which receives the electrode body; a sealing body which seals an opening portion of the case main body; and a sealing body-side insulating member provided between the sealing body and one end portion of the electrode body and a case main body-side insulating member; the one end portion and the other end portion of the electrode body each form a protruding section; and the sealing body-side insulating member includes a base material and an adhesive layer which is disposed on the base material and which contains a cured object of a curable resin, and the protruding section of the one end portion of the electrode body is adhered to the adhesive layer.

10 Claims, 2 Drawing Sheets

(51) Int. Cl.
*H01M 50/107* (2021.01)
*H01M 50/171* (2021.01)
*H01M 50/141* (2021.01)
*H01M 50/152* (2021.01)
*H01M 50/572* (2021.01)
*H01M 10/04* (2006.01)
*H01M 10/052* (2010.01)

(52) U.S. Cl.
CPC ...... *H01M 10/0431* (2013.01); *H01M 10/052* (2013.01); *H01M 50/107* (2021.01); *H01M 50/141* (2021.01); *H01M 50/152* (2021.01); *H01M 50/171* (2021.01); *H01M 50/572* (2021.01); *Y02E 60/10* (2013.01); *Y02P 70/50* (2015.11)

(58) Field of Classification Search
CPC ......... H01M 10/0422; H01M 10/0587; H01M 50/152; H01M 50/572; H01M 50/141; Y02P 70/50; Y02E 60/10
USPC .......................................................... 429/163
See application file for complete search history.

(56) References Cited

U.S. PATENT DOCUMENTS

2017/0084958 A1   3/2017  Ueda
2017/0162837 A1*  6/2017  Sada ................... H01M 50/183

FOREIGN PATENT DOCUMENTS

| | | |
|---|---|---|
| JP | S60-003873 A | 1/1985 |
| JP | H02-010652 A | 1/1990 |
| JP | H05-074444 A | 3/1993 |
| JP | H05-174863 A | 7/1993 |
| JP | 2003-123843 A | 4/2003 |
| JP | 2009-004303 A | 1/2009 |
| JP | 2010-073580 A | 4/2010 |
| JP | 2014-103027 A | 6/2014 |

OTHER PUBLICATIONS

Office Action dated Apr. 2, 2022, issued in counterpart CN application No. 201980018796.4, with English translation. (9 pages).

* cited by examiner

SECONDARY BATTERY

TECHNICAL FIELD

The present invention relates to a secondary battery.

BACKGROUND ART

In recent years, a secondary battery has been increasingly and widely used, for example, as a power source device which supplies electric power to a motor to drive a vehicle, such as an electric car, and a power storage device which stores natural energy or midnight power. The secondary battery as described above has been expected to have a higher capacity and also has been required to have battery safety. As the secondary battery, a battery in which an electrode body including a positive electrode, a negative electrode, and at least one separator interposed between the positive electrode and the negative electrode is received in a battery case may be mentioned (for example, see PTLs 1 and 2).

CITATION LIST

Patent Literature

PTL 1: Japanese Published Unexamined Patent Application No. 2-10652
PTL 2: Japanese Published Unexamined Patent Application No. 5-174863

SUMMARY OF INVENTION

Technical Problem

However, in the secondary battery which includes the electrode body formed from the positive electrode, the negative electrode, and the separator interposed between the positive electrode and the negative electrode, by heat from the outside of the secondary battery, heat generation in the electrode body, and/or the like, the separator may be contracted in some cases. When the separator is contracted, the insulation between the positive electrode and the negative electrode is not maintained, and as a result, a short circuit may occur in some cases.

Accordingly, the present disclosure aims to provide a secondary battery in which the contraction of a separator due to heat is suppressed.

Solution to Problem

A secondary battery according to an aspect of the present disclosure comprises: an electrode body which includes a positive electrode, a negative electrode, and at least one separator interposed between the positive electrode and the negative electrode; a case main body which receives the electrode body; a sealing body which seals an opening portion of the case main body; and a sealing body-side insulating member provided between the sealing body and one end portion of the electrode body and a case main body-side insulating member provided between the case main body and the other end portion of the electrode body. In the secondary battery described above, the one end portion and the other end portion of the electrode body each form a protruding section which is a part of the separator protruding from the positive electrode and the negative electrode, and the sealing body-side insulating member includes a base material and an adhesive layer which is disposed on the base material and which contains a cured object of a curable resin, and the protruding section of the one end portion is adhered to the adhesive layer.

A secondary battery according to another aspect of the present disclosure comprises: an electrode body which includes a positive electrode, a negative electrode, and at least one separator interposed between the positive electrode and the negative electrode; a case main body which receives the electrode body; a sealing body which seals an opening portion of the case main body; and a sealing body-side insulating member provided between the sealing body and one end portion of the electrode body and a case main body-side insulating member provided between the case main body and the other end portion of the electrode body. In the secondary battery described above, the one end portion and the other end portion of the electrode body each form a protruding section which is a part of the separator protruding from the positive electrode and the negative electrode, and the case main body-side insulating member includes a base material and an adhesive layer which is disposed on the base material and which contains a cured object of a curable resin, and the protruding section of the other end portion is adhered to the adhesive layer.

Advantageous Effects of Invention

According to the present disclosure, the secondary battery in which the contraction of the separator due to heat is suppressed can be provided.

DESCRIPTION OF EMBODIMENT

Figure 1:
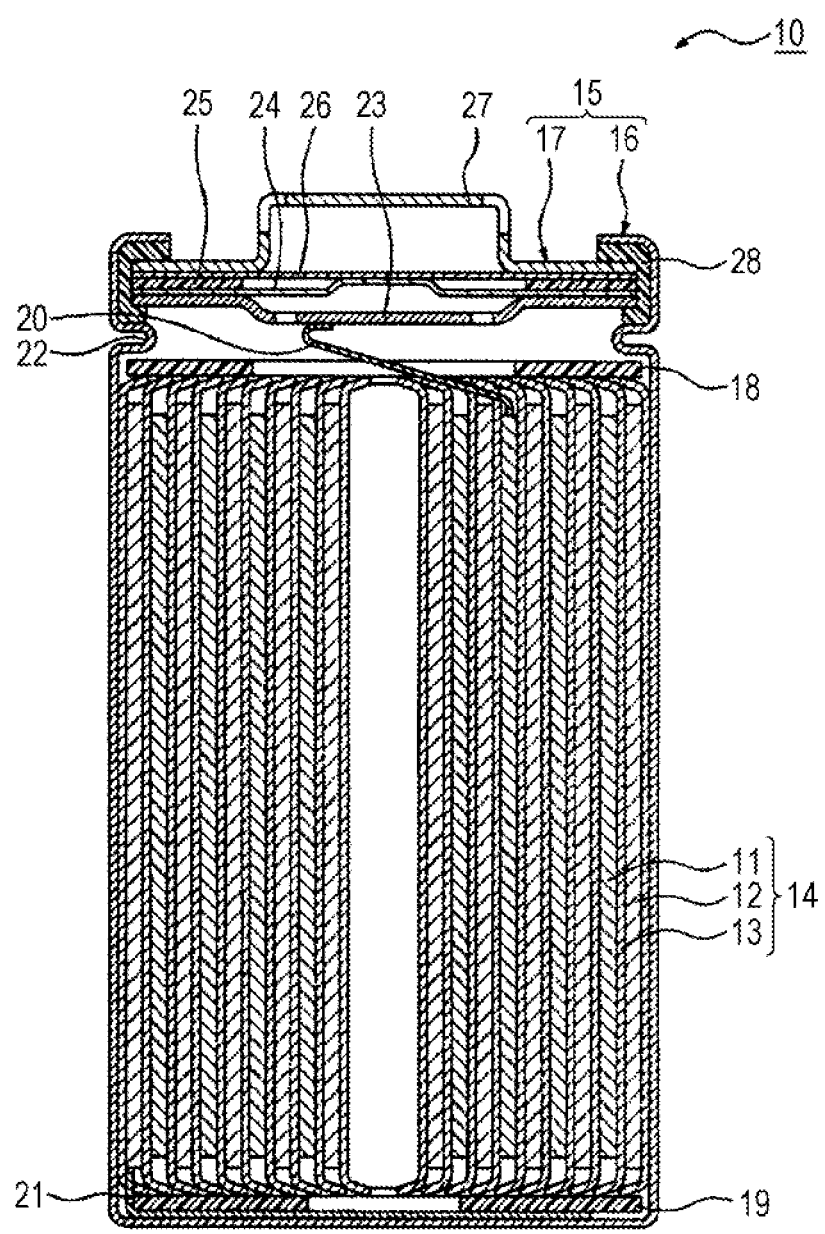
FIG. 1 is a cross-sectional view of a secondary battery according to an embodiment.

Hereinafter, one example of a battery according to one aspect of the present disclosure will be described. The drawings to be used in the following description of the embodiment are each schematically drawn, and hence, for example, the dimensional ratios of constituent elements shown in the drawings may be different from those of actual constituent elements in some cases.

FIG. 1 is a cross-sectional view of a secondary battery according to an embodiment. Although being shown as one example of a lithium ion secondary battery, a secondary battery 10 shown in FIG. 1 is not limited to a lithium ion secondary battery and may be another secondary battery, such as an alkaline secondary battery. Hereinafter, the secondary battery 10 shown in FIG. 1 is called the lithium ion secondary battery 10.

The lithium ion secondary battery 10 shown in FIG. 1 includes a winding type electrode body 14 in which a positive electrode 11 and a negative electrode 12 are spirally wound with at least one separator 13 interposed therebetween, a nonaqueous electrolyte, a sealing body-side insulating member 18 and a case main body-side insulating member 19, a positive electrode tab 20 and a negative electrode tab 21, and a battery case 15.

The battery case 15 receives the electrode body 14, the nonaqueous electrolyte, and the like and includes a bottomclosed cylindrical case main body 16 having an opening portion and a sealing body 17 which seals the opening portion of the case main body 16. The battery case 15 preferably includes a gasket 28 to be provided between the case main body 16 and the sealing body 17, and as a result, air-tightness of the inside of the battery is secured. The battery case 15 is not particularly limited to have a cylindrical shape and may have, for example, a square shape or a pouch type.

The case main body 16 includes, for example, a projecting portion 22 at which a side surface portion of the case main body 16 is partially projected toward the inside and which supports the sealing body 17. The projecting portion 22 is preferably formed to have an annular shape along a circumferential direction so as to support the sealing body 17 by its upper surface.

The sealing body 17 has the structure in which a filter 23, a lower valve 24, an insulating body 25, an upper valve 26, and a cap 27 are laminated in this order from an electrode body 14 side. The members forming the sealing body 17 each have, for example, a disc shape or a ring shape and are electrically connected to each other except for the insulating body 25. The lower valve 24 and the upper valve 26 are connected to each other at the central portions thereof, and between the peripheral portions thereof, the insulating body 25 is provided. When an inside pressure is increased by heat generation due to an internal short circuit or the like, for example, the lower valve 24 is deformed so as to push up the upper valve 26 toward a cap 27 side and is fractured, and an electric current path between the lower valve 24 and the upper valve 26 is blocked. When the inside pressure is further increased, the upper valve 26 is fractured, and a gas is exhausted from an opening portion of the cap 27.

The positive electrode tab 20 is connected at one end thereof to the positive electrode 11. In addition, the positive electrode tab 20 extends from the positive electrode 11 to the filter 23 through a through-hole of the sealing body-side insulating member 18, and the other end of the positive electrode tab 20 is electrically connected to a bottom surface of the filter 23. Accordingly, the cap 27 electrically connected to the filter 23 functions as a positive electrode terminal. In addition, the negative electrode tab 21 is connected at one end thereof to the negative electrode 12. In addition, the negative electrode tab 21 extends from the negative electrode 12 to a bottom inner surface of the case main body 16 along the outside of the case main body-side insulating member 19, and the other end of the negative electrode tab 21 is electrically connected to the bottom inner surface of the case main body 16. Accordingly, the case main body 16 functions as a negative electrode terminal.

Figure 2:
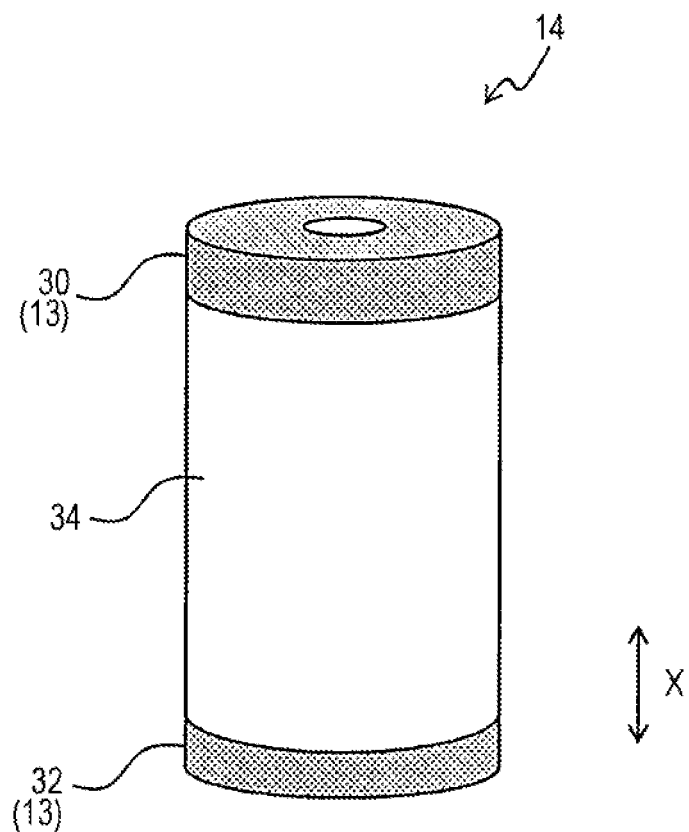
FIG. 2 is a perspective view of a winding type electrode body shown in FIG. 1.

FIG. 2 is a perspective view of the winding type electrode body shown in FIG. 1. In the electrode body 14, the separator 13 is formed wider than each of the positive electrode 11 and the negative electrode 12 and is spirally wound together therewith so as to partially protrude from two ends of each of the positive electrode 11 and the negative electrode 12. In addition, as shown in FIG. 2, one end portion and the other end portion of the electrode body 14 in a winding axial direction (arrow X direction shown in the drawing) each form a protruding section (30 or 32) in which the separator 13 partially protrudes from the positive electrode 11 and the negative electrode 12. In addition, in the electrode body 14, a region between the two protruding sections (30 and 32) forms an electrode main portion 34 in which at least one of the positive electrode 11 and the negative electrode 12 is overlapped with the separator 13.

The sealing body-side insulating member 18 shown in FIG. 1 is provided between the sealing body 17 and the protruding section 30 of the separator 13 which forms the one end portion of the electrode body 14, and the case main body-side insulating member 19 shown in FIG. 1 is provided between the case main body 16 and the protruding section 32 of the separator 13 which forms the other end portion of the electrode body 14. Hereinafter, the structures of the sealing body-side insulating member 18 and the case main body-side insulating member 19 will be described.

Figure 3:
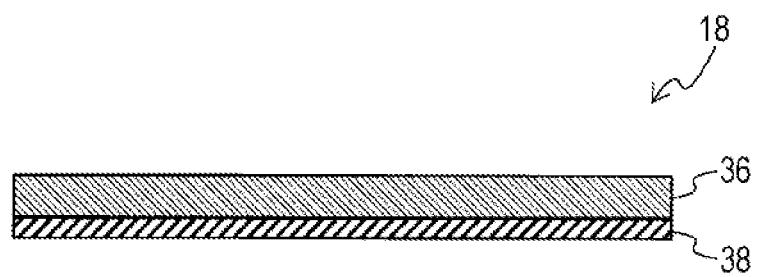
FIG. 3 is a cross-sectional view of a sealing body-side insulating member shown in FIG. 1.

FIG. 3 is a cross-sectional view of the sealing body-side insulating member shown in FIG. 1. The sealing body-side insulating member 18 shown in FIG. 3 includes a base material 36 and an adhesive layer 38 provided on the base material 36. In the sealing body-side insulating member 18, a through-hole (not shown) is preferably formed. This through-hole functions as a path through which the positive electrode tab 20 connected to the positive electrode 11 is connected to the sealing body 17 and, in addition, also functions as a path through which a gas generated in the battery is discharged outside.

As the base material 36, a material having a high insulating property and a high strength is preferable, and for example, there may be mentioned a base material formed from a plastic, such as a polypropylene (PP), or a base material formed from a glass cloth impregnated with a phenol resin. Since having fine holes and irregularities in its surface, the base material formed from a glass cloth impregnated with a phenol resin is preferably able to secure a high adhesion to the adhesive layer 38 by increasing a contact area with the adhesive layer 38.

Although the base material 36 has a flat shape, the shape of the base material 36 is not particularly limited, and for example, a cylindrical shape which covers the protruding section of the separator and the like may also be used. In order to improve the adhesion to the adhesive layer 38 or the like, an arithmetic average roughness (Ra) of the surface of the base material 36 is preferably, for example, in a range of 5 to 20 μm. In addition, in order to improve the adhesion to the adhesive layer 38, a maximum valley depth (Rv) of the surface of the base material 36 is preferably, for example, in a range of 20 to 100 μm.

The adhesive layer 38 contains a cured object of a curable resin, such as a thermosetting resin or a photocurable resin. The adhesive layer 38 is formed such that after a paste containing a curable resin is applied on the base material 36, and the protruding section 30 of the separator 13 which forms the one end portion of the electrode body 14 is then brought into contact with the curable resin on the base material 36, energy of heat, light, or the like is applied thereto, so that the curable resin is cured. Alternatively, the adhesive layer 38 is formed such that after a paste containing a curable resin is applied on the protruding section 30 of the separator 13 which forms the one end portion of the electrode body 14, and the base material 36 is then brought into contact with the curable resin, energy of heat, light, or the like is applied thereto, so that the curable resin is cured. In both cases, the sealing body-side insulating member 18 in which the adhesive layer 38 containing the cured object of the curable resin is disposed on the base material 36 is formed, and in this step, the protruding section 30 of the separator 13 which forms the one end portion of the electrode body 14 is adhered to the adhesive layer 38 on the base material 36. As described above, since the protruding section 30 of the separator 13 which forms the one end portion of the electrode body 14 is adhered to the adhesive layer 38 containing the cured object of the curable resin, and the separator 13 can be fixed to the sealing body-side insulating member 18, the contraction of the separator 13 caused, for example, by heat from the outside of the secondary battery and/or heat generation in the electrode body is suppressed, and hence, a short circuit between the positive electrode 11 and the negative electrode 12 can be suppressed. In order to secure the adhesion to the protruding section of the separator, the adhesive layer 38 preferably has a thickness, for example, in a range of 1 to 100 μm.

As the thermosetting resin to be used for the formation of the adhesive layer 38, for example, there may be mentioned an epoxy-based resin, an acryl-based resin, a polyurethane-based resin, a silicone-based resin, a melamine-based resin, a phenol-based resin, or a polyester-based resin. Among those resins mentioned above, in view of heat resistance, adhesion, resistance against a nonaqueous electrolyte, and the like, a phenol-based resin is preferable. As the thermosetting resin, although either a one-component curable resin or a two-component curable resin may be used, in view of workability, a one-component curable resin is preferable, and in view of a low curing temperature, reduction of thermal damage on the separator 13, and the like, a two-component curable resin is preferable. When the thermosetting resin is used for the formation of the adhesive layer 38, for example, an additive, such as a thermosetting catalyst, may also be added to a paste containing a thermosetting resin.

Although the photocurable resin to be used for the formation of the adhesive layer 38 is not particularly limited as long as being cured by irradiation with light having a predetermined wavelength, for example, there may be mentioned an ultraviolet curable resin to be cured by irradiation with light (ultraviolet light) having a wavelength of 100 to 400 nm, a visible light curable resin to be cured by irradiation with light (visible light) having a wavelength of 400 to 800 nm, or an infrared curable resin to be cured by irradiation with light (infrared light) having a wavelength of 1,200 to 1,500 nm. Compared to the thermosetting resin, the photocurable resin is preferable in terms of the reduction of thermal damage on the separator 13 during curing and the like, and in particular, in terms of the workability, the reduction of thermal damage on the separator 13, and the like, an ultraviolet curable resin to be cured by irradiation with light (ultraviolet light) having a wavelength of 100 to 400 nm is preferable. When the adhesive layer 38 is formed using the photocurable resin, for example, an additive, such as a photopolymerization initiator, may also be added to a paste containing a photocurable resin.

Although not described with reference to the drawings, the case main body-side insulating member 19 has the structure similar to that of the sealing body-side insulating member 18. That is, the case main body-side insulating member 19 includes a base material 36 and an adhesive layer 38 provided on the base material 36. The adhesive layer 38 contains a cured object of a curable resin, such as a thermosetting resin or a photocurable resin. The adhesive layer 38 is formed such that after a paste containing a curable resin is applied on the base material 36, and the protruding section 32 of the separator 13 which forms the other end portion of the electrode body 14 is then brought into contact with the curable resin on the base material 36, energy of heat, light, or the like is applied thereto, so that the curable resin is cured. Alternatively, the adhesive layer 38 is formed such that after a paste containing a curable resin is applied on the protruding section 32 of the separator 13 which forms the other end portion of the electrode body 14, and the base material 36 is then brought into contact with the curable resin, energy of heat, light, or the like is applied thereto, so that the curable resin is cured. In both cases, the case main body-side insulating member 19 in which the adhesive layer 38 containing the cured object of the thermosetting resin is disposed on the base material 36 is formed, and in this step, the protruding section 32 of the separator 13 which forms the other end portion of the electrode body 14 is adhered to the adhesive layer 38 on the base material 36. As described above, since the protruding section 32 of the separator 13 which forms the other end portion of the electrode body 14 is adhered to the adhesive layer 38 containing the cured object of the curable resin, and the separator 13 can be fixed to the case main body-side insulating member 19, the contraction of the separator 13 caused, for example, by heat from the outside of the secondary battery and/or heat generation in the electrode body is suppressed, and hence, a short circuit between the positive electrode 11 and the negative electrode 12 can be suppressed.

In this embodiment, at least one of the sealing body-side insulating member 18 and the case main body-side insulating member 19 may have the structure including the base material 36 and the adhesive layer 38 which is provided on the base material 36 and which contains the cured object of the curable resin, and the protruding section (30 or 32) of the separator 13 which forms the one end portion or the other end portion of the electrode body 14 may be adhered to the adhesive layer 38. Even when one of the sealing body-side insulating member 18 and the case main body-side insulating member 19 only has the structure described above, the contraction of the separator 13 due to heat can be suppressed.

In the lithium ion secondary battery 10 shown in FIG. 1, by using the winding type electrode body 14 as an example, the sealing body-side insulating member 18 disposed between the sealing body 17 and the one end portion of the electrode body 14 and the case main body-side insulating member 19 disposed between the case main body 16 and the other end portion of the electrode body 14 are described. However, in this embodiment, the sealing body-side insulating member 18 and the case main body-side insulating member 19 are not restricted to be used only for the winding type electrode body 14 and may be applied to an electrode body which includes at least one positive electrode 11, at least one negative electrode 12, and at least one separator 13 interposed therebetween, such as a laminate type electrode body in which the positive electrodes 11 and the negative electrodes 12 are alternately laminated to each other with the separators 13 interposed therebetween.

Hereinafter, the positive electrode 11, the negative electrode 12, the nonaqueous electrolyte, and the separator 13 will be described in detail.

The positive electrode 11 includes a positive electrode collector and at least one positive electrode active material layer formed on the positive electrode collector. For the positive electrode collector, for example, foil of a metal, such as aluminum, stable in a potential range of the positive electrode or a film having a surface layer formed of the metal mentioned above may be used. The positive electrode active material layer contains a positive electrode active material. In addition, the positive electrode active material layer preferably contains, besides the positive electrode active material, an electrically conductive material and a binding material.

As the positive electrode active material contained in the positive electrode active material layer, for example, a lithium transition metal composite oxide may be mentioned, and in particular, lithium cobaltate, lithium manganate, lithium nickelate, a lithium nickel manganese composite oxide, or a lithium nickel cobalt composite oxide may be used. To those lithium transition metal composite oxides, Al, Ti, Zr, Nb, B, W, Mg, Mo, and/or the like may also be added.

As the electrically conductive material contained in the positive electrode active material layer, for example, a carbon powder of carbon black, acetylene black, Ketjen black, or graphite may be mentioned. Those materials may be used alone, or at least two types thereof may be used in combination.

As the binding material contained in the positive electrode active material layer, for example, a fluorine-based polymer or a rubber-based polymer may be mentioned. For example, as the fluorine-based polymer, a polytetrafluoroethylene (PTFE), a poly(vinylidene fluoride) (PVdF), or a modified polymer thereof may be mentioned, and as the rubber-based polymer, an ethylene-propylene-isoprene copolymer or an ethylene-propylene-butadiene copolymer may be mentioned. Those materials may be used alone, or at least two types thereof may be used in combination.

The negative electrode 12 includes a negative electrode collector and at least one negative electrode active material layer formed on the negative electrode collector. For the negative electrode collector, for example, foil of a metal, such as copper, stable in a potential range of the negative electrode or a film having a surface layer formed of the metal mentioned above may be used. The negative electrode active material layer contains a negative electrode active material. The negative electrode active material layer preferably contains, besides the negative electrode active material, a thickening material and/or a binding material.

As the negative electrode active material, a carbon material capable of occluding and releasing lithium ions may be used, and besides graphite, a hardly graphitizable carbon, a graphitizable carbon, a fibrous carbon, a coke, a carbon black, or the like may also be used. Furthermore, as a non-carbon material, silicon, tin, or an alloy or oxide using at least one of those mentioned above as a primary component may also be used.

As the binding material, as is the case of the positive electrode, although a PTFE or the like may be used, a styrene-butadiene copolymer (SBR) or its modified polymer may also be used. As the thickening material, for example, a carboxymethyl cellulose (CMC) may be used.

The nonaqueous electrolyte contains, for example, a nonaqueous solvent and an electrolyte salt dissolved therein. The nonaqueous electrolyte is not limited to a liquid electrolyte and may be a solid electrolyte using a gel polymer or the like. As the nonaqueous solvent, for example, a carbonate, a lactone, an ether, a ketone, an ester, or a mixed solvent containing at least two of those solvents may be used.

As the electrolyte salt, for example, a lithium salt may be mentioned. For example, $LiPF_6$, $LiBF_4$, $LiCF_3SO_3$, or a mixture containing at least two of those salts may be used. The amount of the electrolyte salt to the solvent is, for example, 0.5 to 2.0 mol/L.

For the separator 13, for example, a porous sheet having an ion permeability and an insulating property may be used. As a particular example of the porous sheet, for example, a fine porous thin film, a woven cloth, or a non-woven cloth may be mentioned. As a material of the separator 13, for example, an olefin-based resin, such as a polyethylene or a polypropylene, or a cellulose is preferable. The separator 13 may be a laminate having a cellulose fiber layer and a thermoplastic resin fiber layer formed of an olefin-based resin or the like. In addition, a multilayer separator including at least one polyethylene layer and at least one polypropylene layer may also be used, and a separator having a surface to which a material, such as an aramid-based resin or a ceramic, is applied may also be used.

REFERENCE SIGNS LIST 10 lithium ion secondary battery, 11 positive electrode, 12 negative electrode, 13 separator, 14 electrode body, 15 battery case, 16 case main body, 17 sealing body, 18 sealing body-side insulating member, 19 case main body-side insulating member, 20 positive electrode tab, 21 negative electrode tab, 22 projecting portion, 23 filter, 24 lower valve, 25 insulating body, 26 upper valve, 27 cap, 28 gasket, 30, 32 protruding section, electrode main portion, 36 base material, 38 adhesive layer

The invention claimed is:

1. A secondary battery comprising:
   an electrode body which includes a positive electrode, a negative electrode, and at least one separator interposed between the positive electrode and the negative electrode;
   a case main body which receives the electrode body;
   a sealing body which seals an opening portion of the case main body; and
   a sealing body-side insulating member provided between the sealing body and one end portion of the electrode body and a case main body-side insulating member provided between the case main body and the other end portion of the electrode body,
   wherein the one end portion and the other end portion of the electrode body each form a protruding section which is a part of the separator protruding from the positive electrode and the negative electrode, and
   the sealing body-side insulating member includes a base material and an adhesive layer which is disposed on the base material and which contains a cured object of a curable resin, and the protruding section of the one end portion is configured to be adhered to the adhesive layer such that the separator is fixed in position to the sealing body-side insulating member via adhesion of said protruding section to the adhesive layer.

2. The secondary battery according to claim 1, wherein the electrode body is a winding type electrode body in which the positive electrode, the negative electrode and the separator are spirally wound, and the one end portion and the other end portion of the electrode body are one end portion and the other end portion of the electrode body, respectively, in a winding axial direction of the electrode body.

3. The secondary battery according to claim 1, wherein the cured object of the curable resin is a cured object of a photocurable resin which is to be cured when being irradiated with a light having a predetermined wavelength.

4. The secondary battery according to claim 1, wherein the predetermined wavelength is in a range of 100 to 400 nm.

5. The secondary battery according to claim 1, wherein the adhesive layer has a thickness of 1 to 100 μm.

6. A secondary battery comprising:
   an electrode body which includes a positive electrode, a negative electrode, and at least one separator interposed between the positive electrode and the negative electrode;
   a case main body which receives the electrode body;
   a sealing body which seals an opening portion of the case main body; and a sealing body-side insulating member provided between the sealing body and one end portion of the electrode body and a case main body-side insulating member provided between the case main body and the other end portion of the electrode body, wherein the one end portion and the other end portion of the electrode body each form a protruding section which is a part of the separator protruding from the positive electrode and the negative electrode, and the case main body-side insulating member includes a base material and an adhesive layer which is disposed on the base material and which contains a cured object of a curable resin, and the protruding section of the other end portion is configured to be adhered to the adhesive layer such that the separator is fixed in position to the case main body-side insulating member via adhesion of said protruding section to the adhesive layer.

7. The secondary battery according to claim 6,
wherein the electrode body is a winding type electrode body in which the positive electrode, the negative electrode and the separator are spirally wound, and the one end portion and the other end portion of the electrode body are one end portion and the other end portion of the electrode body, respectively, in a winding axial direction of the electrode body.

8. The secondary battery according to claim 6,
wherein the cured object of the curable resin is a cured object of a photocurable resin which is to be cured when being irradiated with a light having a predetermined wavelength.

9. The secondary battery according to claim 6,
wherein the predetermined wavelength is in a range of 100 to 400 nm.

10. The secondary battery according to claim 6,
wherein the adhesive layer has a thickness of 1 to 100 μm.

* * * * *